United States Patent [19]
Jung

[11] Patent Number: 6,061,233
[45] Date of Patent: May 9, 2000

[54] DOCKING STATION FOR A LAPTOP COMPUTER

[75] Inventor: Hae-Soo Jung, Kyunggi-do, Rep. of Korea

[73] Assignee: SamSung Electronics Co., Ltd., Kyungki-do, Rep. of Korea

[21] Appl. No.: 09/203,682

[22] Filed: Dec. 1, 1998

[30] Foreign Application Priority Data

Jan. 13, 1998 [KR] Rep. of Korea .......................... 98-721

[51] Int. Cl.⁷ ..................................................... G06F 1/16
[52] U.S. Cl. .................................. 361/686; 70/58; 292/163
[58] Field of Search ........................... 361/686; 292/163; 70/58

[56] References Cited

U.S. PATENT DOCUMENTS

| | | |
|---|---|---|
| 4,558,914 | 12/1985 | Prager et al. ............................ 361/686 |
| 4,659,159 | 4/1987 | Takahashi .............................. 361/686 |
| 5,310,358 | 5/1994 | Johnson et al. . |
| 5,535,093 | 7/1996 | Noguchi et al. . |
| 5,580,182 | 12/1996 | Lin . |
| 5,699,226 | 12/1997 | Cavello .................................. 361/686 |
| 5,737,541 | 4/1998 | Shimizu et al. ....................... 361/686 |
| 5,928,017 | 7/1999 | Lan ....................................... 361/686 |

*Primary Examiner*—Leo P. Picard
*Assistant Examiner*—John D. Reed
*Attorney, Agent, or Firm*—Robert E. Bushnell, Esq.

[57] ABSTRACT

A docking station that has vertical restraints that are pressed down by the bottom surface of the portable computer. This causes the vertical restraints to engage receptacles that are formed in the bottom side of the portable computer. To disengage the portable computer from the docking station the computer must be moved laterally to release the vertical restraints from the portable computer. This prevents the portable computer and the docking station from being damaged by a user when the portable computer is lifted off of the docking station in an improper manner.

20 Claims, 8 Drawing Sheets

DOCKING STATION FOR A LAPTOP COMPUTER

CLAIM OF PRIORITY

This application makes reference to, incorporates the same herein, and claims all rights accruing thereto under 35 U.S.C. §119 through my patent application entitled Extension Apparatus for Portable Computers earlier filed in the Korean Industrial Property Office on the 13th day of January 1998 and there duly assigned Ser. No. 1998/00721.

BACKGROUND OF THE INVENTION

1. Field of the Invention

The present invention relates to a docking station for portable computers and, more specifically, to a docking station that prevents damage to both the portable computer and the docking station by preventing a user from incorrectly disengaging a portable computer from a docking station.

2. Background Art

The ease of traveling with portable computers, e.g. portable computers, has been one of the factors in their increasing popularity. A portable computer is often constructed with a liquid crystal display hingedly attached to the main body of the computer. The display panel also forms a cover for the keyboard, that is built onto the main body. Various ports are located along the rear side of the main body for attaching various input or output devices. However, the amount of time necessary to connect and disconnect a portable computer from peripheral devices is often inconvenient when a user is in a rush. To simplify the connection of portable computer computers to peripheral devices, a docking station is used to allow the portable computer to quickly connect and disconnect to a host of peripheral devices. The connection between the portable computer and the docking station is important for the effective use of the portable computer. Different techniques for connecting a portable computer to a docking station are shown, for example, in U.S. Pat. No. 5,580,182 to Lin entitled Computer Peripheral Engagement/Disengagement Mechanism, U.S. Pat. No. 5,535,093 to Noguchi entitled Portable Computer Docking Device Having a First Rotatable Connector and a Second Connectoi, and U.S. Pat. No. 5,310,358 to Johnson entitled Computer Docking Sypole. I have observed, however, that the docking stations of the contemporary art are easily damaged when the front of the portable computer is lifted off of the docking station while disengaging the portable computer from the docking station. This causes the portable computer to pivot around the rear side of its housing and can cause damage to either of the interface ports that are located on either the rear side of the portable computer or on the docking station.

As such, I believe that it may be possible to improve on the contemporary art by providing a docking station that secures the bottom of a portable computer to the docking station, that is simple to construct, that is economical to produce, that prevents the incorrect disengagement of the portable computer from the docking station, and that extends the usable lifespan of the portable computer.

SUMMARY OF THE INVENTION

Accordingly, it is an object of the present invention to provide an improved docking station.

It is another object to provide a docking station that is simple to construct.

It is still another object to provide a docking station that is economical to manufacture.

It is yet another object to provide a docking station that prevents the incorrect disengagement of the portable computer from the docking station.

It is still yet another object to provide a docking station that has an increased lifespan due to the reduced probability of being damaged during regular operations.

To achieve these and other objects, a portable computer is provided that may be constructed using a housing having a front side bearing a port for interfacing with a portable computer. Attached to a tray section, upon which the portable computer is supported while the portable computer engages the docking station, is a pair of vertical restraints. When the portable computer is mounted on the docking station, the vertical restraints are pressed down by the bottom surface of the portable computer. This causes the vertical restraints to engage receptacles that are formed in the bottom side of the portable computer. To disengage the portable computer from the docking station the computer must be moved laterally to release the vertical restraints from the portable computer. This prevents the portable computer and the docking station from being damaged by a user when the portable computer is lifted off of the docking station in an improper manner.

The vertical restraint may be constructed using a body that may have a cylindrical shape. The body is engageable with the tray section of the docking station. The body has a chute inside in which a latch is positioned. The latch slides along the chute and a spring is placed over a portion of the latch to bias it in a direction outward from the computer chassis.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 5b is a bottom view of FIG. 5a;

DETAILED DESCRIPTION OF THE DRAWINGS

Figure 1:
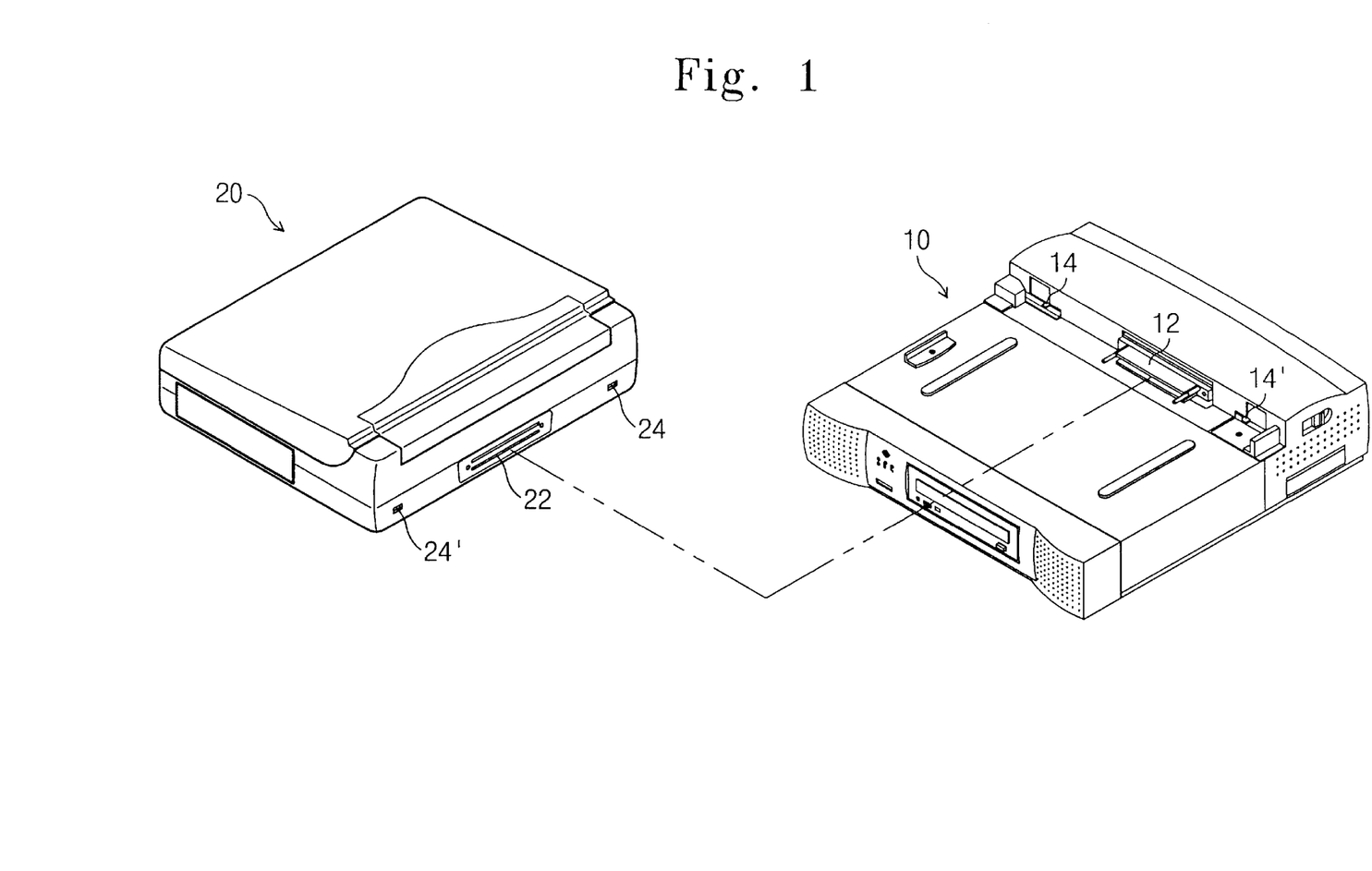
FIG. 1 is a perspective view illustrating a portable computer and a docking station separated from the portable computer.
Figure 2:
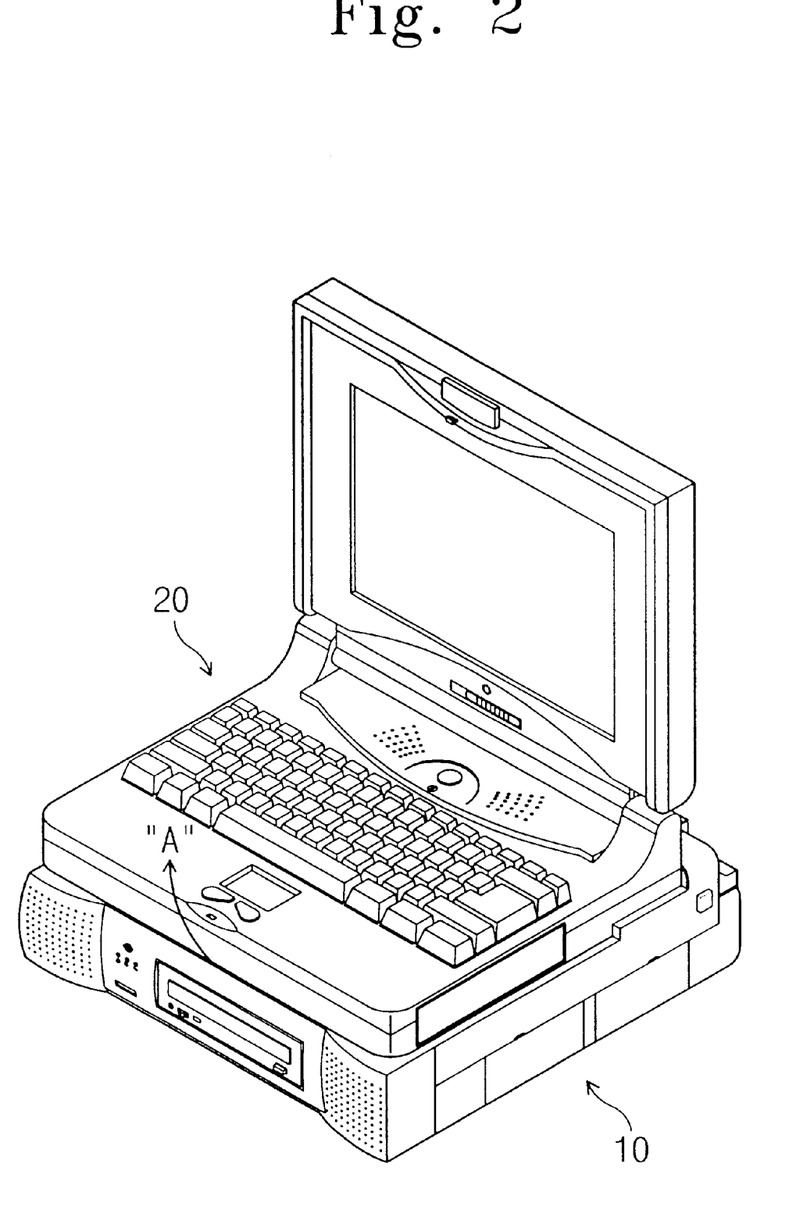
FIG. 2 is a perspective view of the portable computer mounted to the docking station of FIG. 1.

Turning now to the drawings, FIG. 1 illustrates portable computer 20 and docking station 10. FIG. 2 shows portable computer 20 and docking station 10 engaged together. To steadily mount portable computer 20 to docking station 10, latches 14 and 14' are positioned on docking station 10. Latches 14 and 14' engage with holes 24 and 24' that are formed on the rear side of portable computer 20 to secure the portable computer to the docking station. Port 12 is positioned on the docking station to connect to port 22 of the portable computer.

Figure 3:
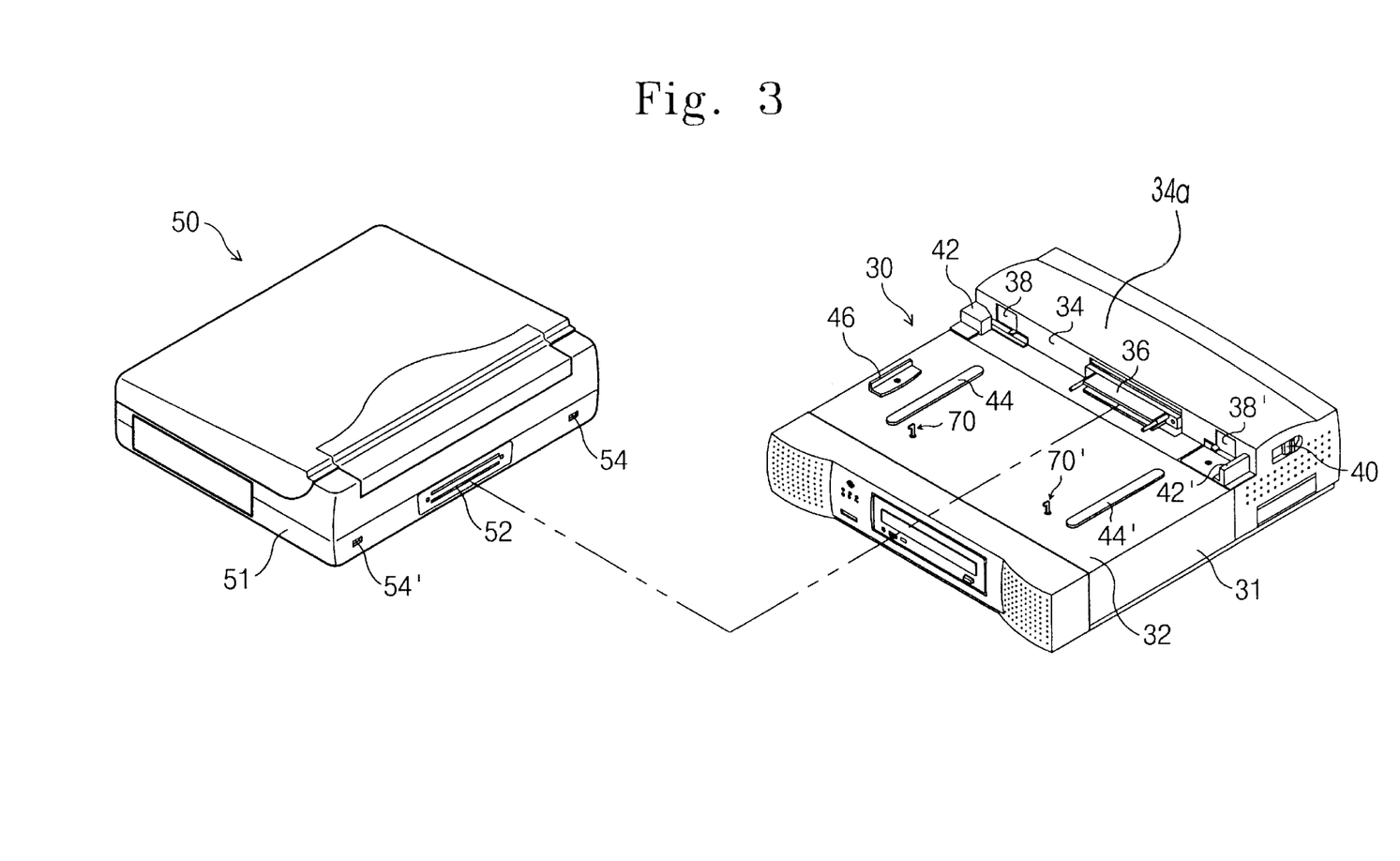
FIG. 3 is a perspective view illustrating a portable computer and a docking station as constructed in accordance with the preferred embodiment of the present invention.
Figure 4:
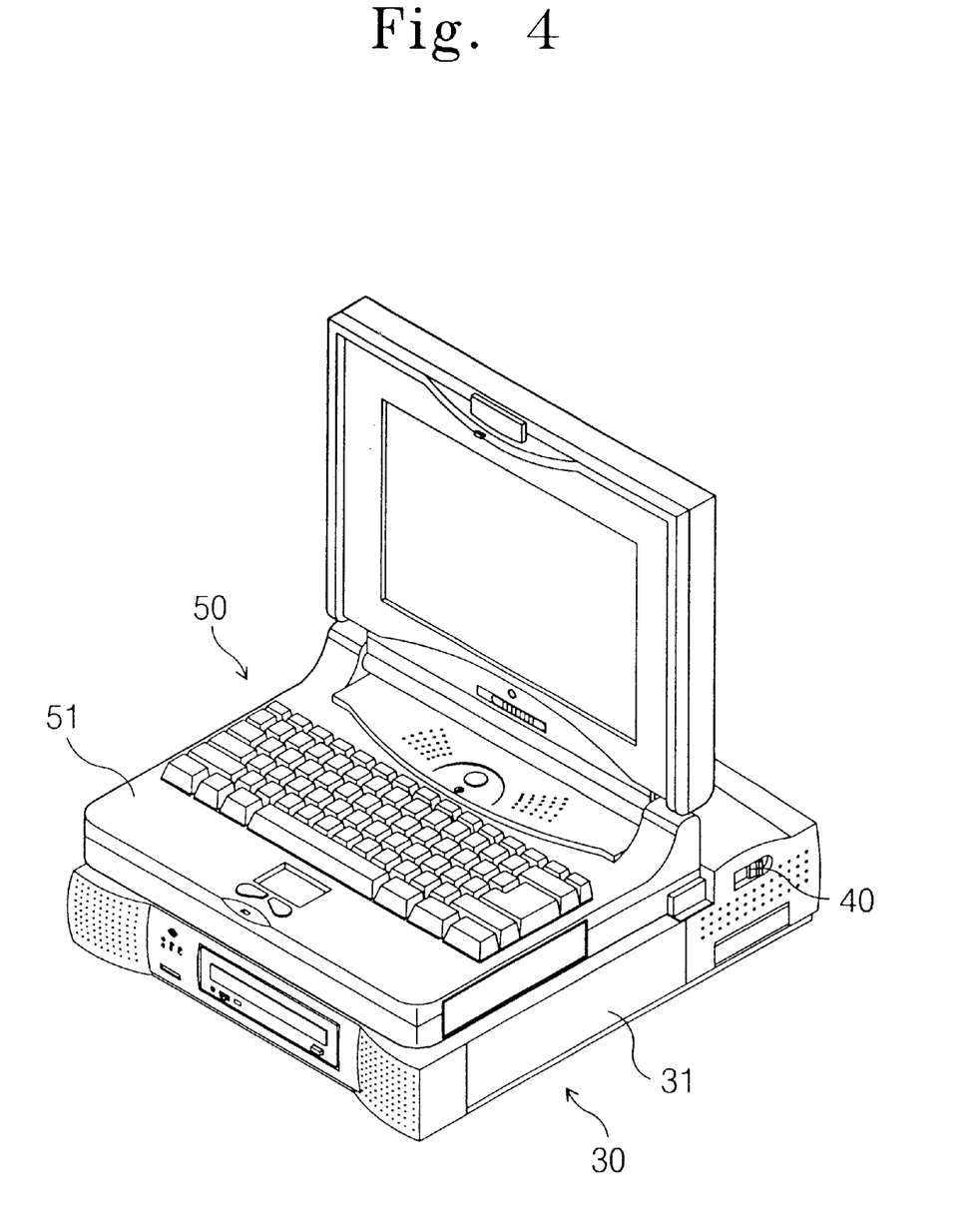
FIG. 4 is a perspective view illustrating the portable computer mounted to the docking station of FIG. 3.

FIGS. 3 to 8b illustrate a docking station as constructed according to the principles of the present invention. As shown in FIGS. 3 and 4, docking station 30 is used for increasing the functionality of portable computer 50 to allow the laptop to have the capabilities of a desktop computer. Docking station 30 is easily engaged with and separated from portable computer 50. The docking station is interfaced with portable computer 50 by ports 36 and 52. When portable computer 50 is mounted to docking station 30, port 52 of the portable computer is connected to port 36 of the docking station.

In addition, the docking station 30 is provided with a plurality of side and bottom guides 42, 42', 44, 44' and 46 to correctly align portable computer 50. Thus, port 52, of the portable computer, is correctly connected to port 36 of the docking station when the guider rails and bottom guides 42, 42', 44, 44' and 46 properly align the portable computer with the docking station. When portable computer 50 is mounted to docking station 30, the side portion of portable computer 50 is properly aligned by side guide rails 42, 42' and 46, while portable computer 50 is supported by bottom guides 44 and 44. Side guide rails 42, 42' and 46 may be adjusted in accordance with the type of portable computer being engaged with the docking station. Alternatively, side guide rails 42, 42' and 46 may be fixedly formed during the manufacturing of docking station 30.

Docking station 30 has a housing capable of supporting portable computer 50, thus allowing portable computer 50 to be correctly mounted onto docking station 30. As a result, port 52, of the portable computer, is correctly and steadily connected to port 36, of docking station 30.

Docking station 30 may be constructed with a housing that may be comprised of structure 34a that has front side 34. Tray 31 is attached to the front side of structure 34a to allow the portable computer to be mounted on the docking station. Protruding from tray 31 are vertical restraints 70 and 70' that prevent the incorrect disengagement of the portable computer from the docking station. In addition, lateral restraints 38 and 38', projecting from front side 34 of structure 34a, are capable of engaging holes 54 and 54' that are formed in housing 51 of portable computer 50. Lateral restraints 38 and 38' engage with and are separated from engaging holes 54 and 54' by lever 40 that is mounted to a side wall of docking station 30. The vertical restraint of the docking station 30 is capable of allowing the portable computer to be easily mounted to and separated from top side 32 of tray 31.

Figure 5A:
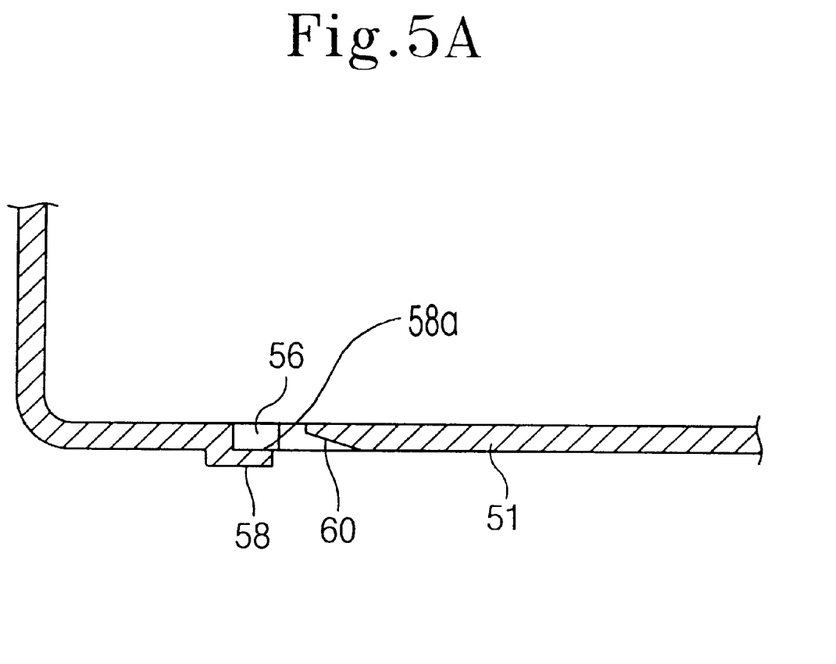
FIG. 5a is cross-sectional view illustrating an engaging part formed on the portable computer of FIG. 3.
Figure 5B:
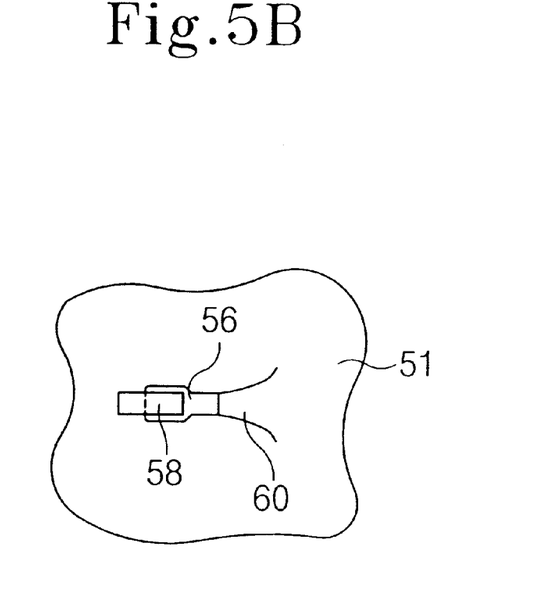
Figure 6:
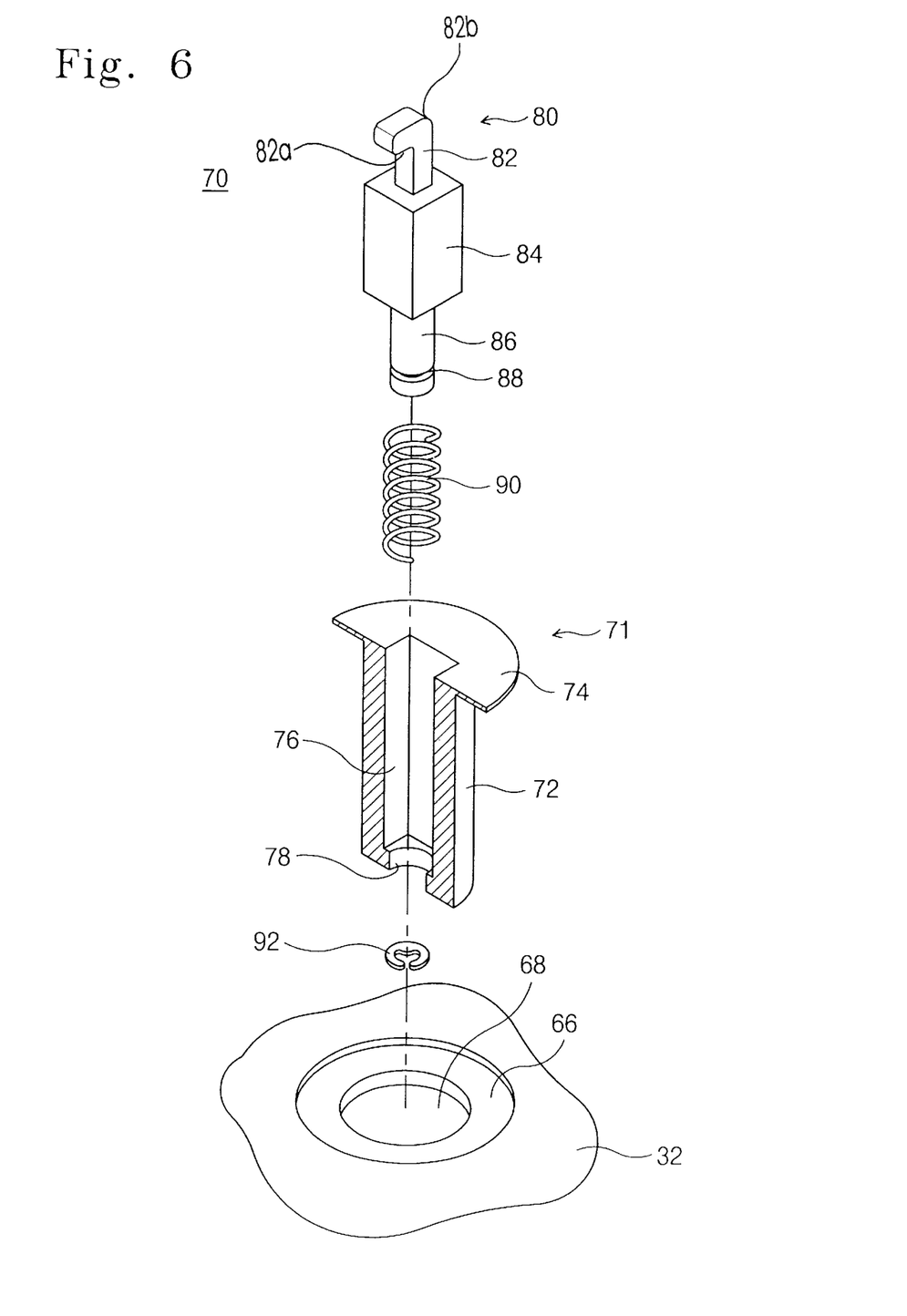
FIG. 6 is an exploded perspective view of a latch member of the docking station of FIG. 3.

FIG. 5a illustrates an engaging portion of the portable computer as constructed according to a preferred embodiment of this invention and FIG. 5b is a bottom view of FIG. 5a. FIG. 6 is an exploded perspective view of latch member 80 of the docking station of the present invention. As shown in FIGS. 5a through 6, the front portion of the portable computer 50 is restrained from being vertically removed from docking station 30 by a vertical restraint (not shown). Vertical restraint 80 of docking station 30 may be recessed into top side 32 of tray 31. The vertical restraint is then engaged with housing 51 of the portable computer by inserting the latch member inside gap 56 in the housing of the portable computer.

Vertical restraint 70 may be constructed using includes a cylinder 71 and latch 82, as shown in FIG. 6. Seating surface 66 is formed on top side 32 of tray 31, while counterbored hollow 68 forms seating surface 66. Body 72 has flange 74 attached on a top surface. Chute 76 is formed from a location proximate to the bottom surface of body 72 through flange 74. Thus, body 72 may be inserted into the hollow in tray 31 of the docking station. Flange 74 of the latch member may be fixed to seating surface 66 of the docking station 30 by fasteners or adhesive. In the preferred embodiment of this invention, flange 74 is fixed to seating surface 66 by studs.

Sliding body 84 is receivably engaged with chute 76 and also has an attached latch 82. On an opposite side is pole 86 that may be enclosed in spring 90 to bias the latch in an outward position. Sliding body 84 moves along chute 76 and is kept in the proper orientation by the chute's rectangular cross-sectional shape, as shown in FIG. 6. Thus, the shape of sliding body 84 prevents latch 82 from rotating out of position. As a result, the front end of latch 82 faces the mounting direction of portable computer 50.

Pole 86 of latch member 80 is inserted into spring 90 so that latch 82 is vertically biased out of the interior of body 72. The free end of pole 86 protrudes through to the exterior of body 72 by passing through opening 78. Circumferential groove 88 is formed on pole 86 to engage retaining ring 92 that is fitted into the circumferential groove to prevent latch 82 from being separated from body 72.

To mount vertical restraint 70 to housing 51 of the portable computer latch engaging hole 56 forming latch seat 58 and inclined surface 60 is formed in housing 51, as shown in FIG. 5a. When portable computer 50 is mounted to docking station 30, the latch engaging hole 56 is formed on the housing 51 at a position corresponding to the latch 82. Latch seat 58 has an "L"-shaped cross sectional shape. Thus, the latch 82 easily engages with and is separated from the latch seat 58. The inclined surface 60 is formed along a slanted angle to guide latch 82 while the portable computer is mounted on the docking station.

Figure 7A:
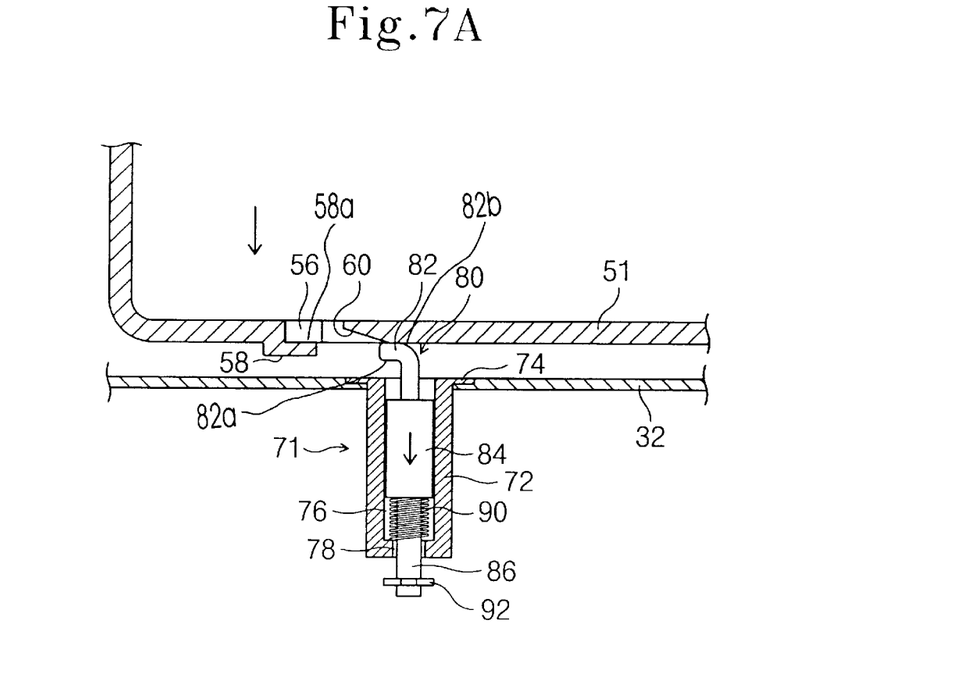
FIG. 7a is a cross-sectional view illustrating the latch of FIG. 3, as the portable computer is being mounted to the docking station.
Figure 7B:
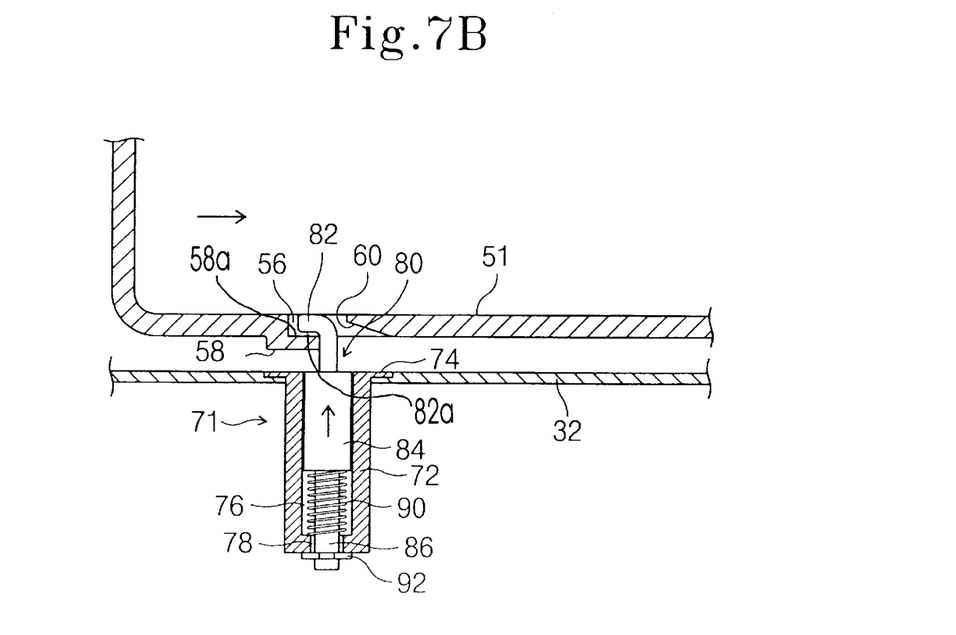
FIG. 7b is a cross-sectional view illustrating the latch of FIG. 3, while the portable computer is mounted to the docking station.
Figure 8A:
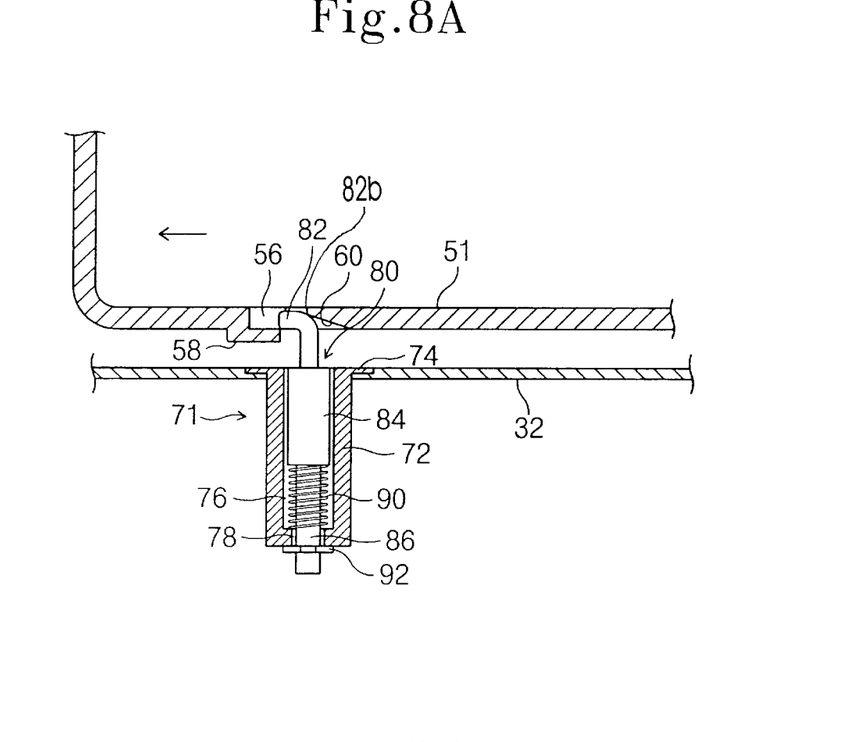
FIG. 8a is a cross-sectional view illustrating the latch of FIG. 3, as the portable computer is disengaging from the docking station.
Figure 8B:
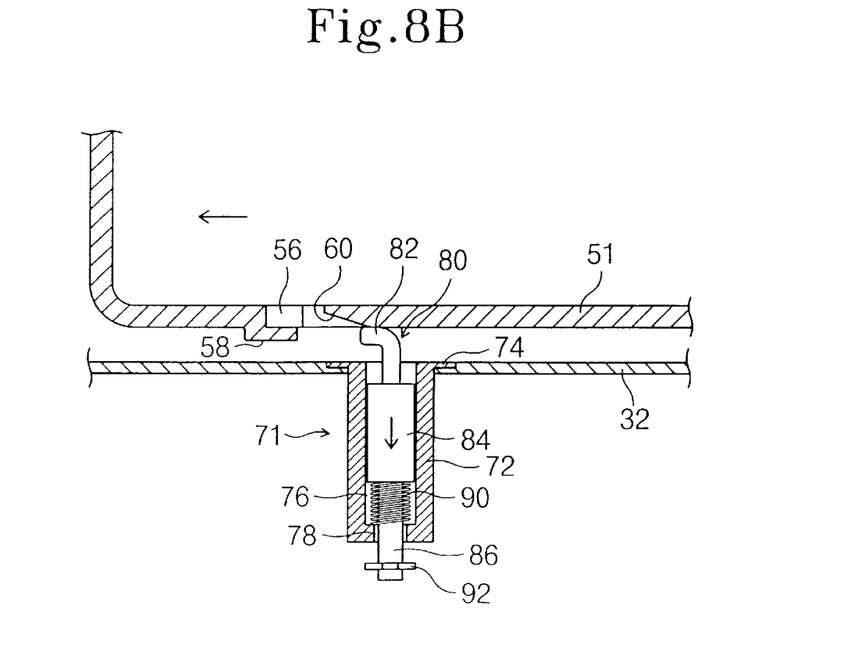
FIG. 8b is a cross-sectional view illustrating the latch of FIG. 3, after the portable computer has been separated from the docking station.

FIGS. 7a and 7b illustrate the latch as it engages the portable computer, while the portable computer is mounted to the docking station. FIGS. 8a and 8b illustrate the latch, while the portable computer is being separated from the docking station.

When portable computer 50 is mounted to docking station 30, the front portion of the portable computer 50 is primarily fixed to the docking station 30. In a brief description, the portable computer 50 rests on the top side 32 of the docking station 30. At this time, the latch 80 is pressed down by the housing 51 of the portable computer 50 and is inserted into the interior of cylinder 71. Also, the spring 90 is compressed during the inserting of the latch 80. In the drawings, the housing 51 of the portable computer 50 is not brought into contact with the top side 32 of the docking station 30 but it has no effect on the functioning of this invention.

Thereafter, by pushing the portable computer 50 into position to interface ports 52 and 36, latch 82 is compressed by housing 51. While latch 82 of comes into contact with the inclined surface 60 of the housing 51 curved portion 82b of latch 82 abuts inclined surface 60. This causes latch 82 to be compressed until the portable computer is connected to latch 82 and surface 82a of latch 82 is connected with surface 58a of engaging hole 56. Therefore, it is not possible for the front portion of the portable computer 50 to be lifted while the ports of the portable computer are interfaced with the docking station. When portable computer 50 is separated from docking station 30, the operation state of the latch 80 is carried out in reverse manner as that described above. More specifically, as the portable computer is disengaged form the docking station, slanted surface 60 contacts curved portion 82b of latch 82 and compresses latch 82 as the computer laterally disengages from the docking station. Thus, to disengage the portable computer from the docking station the computer must be moved laterally to release the vertical restraints from the portable computer. This prevents the portable computer and the docking station from being damaged by a user when the portable computer is lifted off of the docking station in an improper manner. Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A docking station for a portable computer, said docking station comprising:
   a housing comprising:
      a structure having a front side, bearing a port that interfaces with said portable computer, and bearing a plurality of peripheral ports that can interface with a peripheral device; and
      a tray attached to said structure, having a top side, and extending from said front side of said structure to support said portable computer while said portable computer is interfaced with said chassis; and
      said top side of said tray bearing a counterbored hollow, said counterbored hollow forming a seating surface;
   a mechanism that engages said front side of said structure with said portable computer while said portable computer is seated on said top side of said tray;
   a vertical restraint slidably engaged said counterbored hollow, said vertical restraint comprising:
      a body having a top surface;
      a flange attached to said top surface of said body and seatable on said seating surface;
      a latch slidably engaged inside of said body and protruding through said flange; and
      an elastic member positioned inside said body and biasing said latch outward from said chassis; and
   said vertical restraint engaging a bottom surface of said portable computer while said portable computer is engaged with said mechanism.

2. The docking station of claim 1, further comprised of said flange of said vertical restraint being flush with said top side of said tray.

3. The docking station of claim 2, further comprising a plurality of bottom guides positioned on said top side of said tray to facilitate the proper alignment of said portable computer on said docking station.

4. The docking station of claim 3, further comprising a plurality of side guides positioned on said top side of said tray to facilitate the proper alignment of said portable computer on said docking station.

5. The docking station of claim 4, further comprised of said mechanism being a pair of latches each protruding through said front side of said structure and being releasably engageable with said portable computer.

6. The docking station of claim 5, further comprised of said vertical restraint forcing said portable computer to disengage from said port of said docking station in a substantially lateral manner.

7. The docking station of claim 6, with said vertical restraint further comprising:
   said body having a chute running from proximate to a bottom surface of said body through said flange;
   said latch being attached to a sliding body that has a shape corresponding to said chute; and
   a pole attached to an opposite side of said body.

8. The docking station of claim 7, with said vertical restraint further comprising:
   said elastic member being disposed over said pole to bias said latch;
   said bottom surface of said body bearing an opening connected to said chute; and
   said pole protruding through said opening.

9. The docking station of claim 8, further comprising:
   said pole having a circumferential groove;
   a restraining ring engaged with said circumferential groove and on a side of said bottom surface opposite from said chute, thus preventing said latch from disengaging from said vertical restraint.

10. A docking station for a portable computer, said docking station comprising:
    a housing comprising:
       a structure having a front side, bearing a port that interfaces with said portable computer, and bearing a plurality of peripheral ports that can interface with a peripheral device; and
       a tray attached to said structure, having a top side, and extending from said front side of said structure to support said portable computer while said portable computer is interfaced with said chassis; and
       said top side of said tray bearing a counterbored hollow, said counterbored hollow forming a seating surface;
    a mechanism that engages said front side of said structure with said portable computer while said portable computer is seated on said top side of said tray;
    a vertical restraint slidably engaged said counterbored hollow, said vertical restraint comprising:
       a body having a top surface and a bottom surface;
       a flange attached to said top surface of said body and seatable on said seating surface;
       said body having a chute running from proximate to said bottom surface through said flange;
       a pole attached to an opposite side of said body from said flange;
       a latch slidably engaged inside of said body and protruding through said flange; and
       an elastic member positioned over said pole and inside said chute, said elastic member biasing said latch outward from said chassis; and
    said vertical restraint engaging a bottom surface of said portable computer while said portable computer is engaged with said mechanism and forcing said portable computer to disengage from said port of said docking station in a substantially lateral manner.

11. The docking station of claim 10, further comprised of said flange of said vertical restraint being flush with said top side of said tray.

12. The docking station of claim 11, further comprising a plurality of bottom guides positioned on said top side of said tray to facilitate the proper alignment of said portable computer on said docking station.

13. The docking station of claim 12, further comprising a plurality of side guides positioned on said top side of said tray to facilitate the proper alignment of said portable computer on said docking station.

14. The docking station of claim 13, further comprised of said mechanism being a pair of latches each protruding through said front side of said structure and being releasably engageable with said portable computer.

15. The docking station of claim 14, with said vertical restraint further comprising:
   said bottom surface of said body bearing an opening connected to said chute; and
   said pole protruding through said opening.

16. The docking station of claim 15, further comprising:
   said pole having a circumferential groove;
   a restraining ring engaged with said circumferential groove and on a side of said bottom surface opposite from said chute, thus preventing said latch from disengaging from said vertical restraint.

17. A docking station for a portable computer, said docking station comprising:
   a housing comprising:
      a structure having a front side, bearing a port that interfaces with said portable computer, and bearing a plurality of peripheral ports that can interface with a peripheral device; and
      a tray attached to said structure, having a top side, and extending from said front side of said structure to support said portable computer while said portable computer is interfaced with said chassis; and
      said top side of said tray bearing a hollow;
   a pair of latches each protruding through said front side of said structure and being releasably engageable with said portable computer while said portable computer is seated on said top side of said tray;
   a vertical restraint slidably engaged said hollow, said vertical restraint comprising:
      a body having a top surface and a bottom surface;
      a flange attached to said top surface of said body;
      said body having a chute running from proximate to said bottom surface through said flange;
      pole attached to an opposite side of said body from said flange;
      a latch slidably engaged inside of said body and protruding through said flange; and
      an elastic member positioned over said pole and inside said chute, said elastic member biasing said latch outward from said chassis; and
   said vertical restraint engaging a bottom surface of said portable computer while said portable computer is engaged with said mechanism and forcing said portable computer to disengage from said port of said docking station in a substantially lateral manner.

18. The docking station of claim 17, further comprised of said flange of said vertical restraint being flush with said top side of said tray.

19. The docking station of claim 18, further comprising a plurality of bottom guides positioned on said top side of said tray to facilitate the proper alignment of said portable computer on said docking station.

20. The docking station of claim 19, further comprising a plurality of side guides positioned on said top side of said tray to facilitate the proper alignment of said portable computer on said docking station.

\* \* \* \* \*